United States Patent
Kim et al.

(10) Patent No.: US 11,895,604 B2
(45) Date of Patent: Feb. 6, 2024

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seonwook Kim, Seoul (KR); Kijun Kim, Seoul (KR); Sukhyon Yoon, Seoul (KR); Hyunsoo Ko, Seoul (KR); Suckchel Yang, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 17/621,880

(22) PCT Filed: Aug. 24, 2020

(86) PCT No.: PCT/KR2020/011246
§ 371 (c)(1),
(2) Date: Dec. 22, 2021

(87) PCT Pub. No.: WO2021/040350
PCT Pub. Date: Mar. 4, 2021

(65) Prior Publication Data
US 2022/0264492 A1    Aug. 18, 2022

(30) Foreign Application Priority Data

Aug. 23, 2019  (KR) .................. 10-2019-0104011

(51) Int. Cl.
*H04W 56/00* (2009.01)
*H04L 5/00* (2006.01)
*H04L 27/26* (2006.01)

(52) U.S. Cl.
CPC ......... *H04W 56/001* (2013.01); *H04L 5/0051* (2013.01); *H04L 27/2607* (2013.01); *H04L 27/2636* (2013.01)

(58) Field of Classification Search
None
See application file for complete search history.

(56) References Cited

U.S. PATENT DOCUMENTS

2018/0227101 A1   8/2018  Park et al.
2019/0387550 A1*  12/2019 Pan ................. H04W 74/0833
(Continued)

FOREIGN PATENT DOCUMENTS

WO   2017201273 A1   11/2017
WO   2019005311 A1   1/2019

OTHER PUBLICATIONS

Samsung, "On physical layer structures for NR V2X", 3GPP TSG RAN WG1 #96, Feb. 25-Mar. 1, 2019, R1-1902273.
(Continued)

*Primary Examiner* — Hong Shao
(74) *Attorney, Agent, or Firm* — BRYAN CAVE LEIGHTON PAISNER LLP

(57) ABSTRACT

The present invention relates to a wireless communication system and, more particularly, to a method and an apparatus therefor, the method comprising the steps of: detecting an SS/PBCH block, wherein the SS/PBCH block includes a PBCH payload and a PBCH DMRS; and on the basis of characteristics of the PBCH DMRS, processing the PBCH payload on the basis of any one from among a plurality of WF methods, wherein the plurality of WFs include at least a CP-OFDM method and a DFT-s-OFDM method.

12 Claims, 19 Drawing Sheets

(56) References Cited

U.S. PATENT DOCUMENTS

2020/0053781 A1* 2/2020 Pan .................. H04W 72/30
2021/0006443 A1* 1/2021 Morozov ............ H04J 13/0029

OTHER PUBLICATIONS

ZTE, Sanechips, "Discussion on synchronization mechanism in NR V2X", 3GPP TSG RAN WG1 #98, Aug. 26-30, 2019, R1-1908895.

* cited by examiner

METHOD AND APPARATUS FOR TRANSMITTING AND RECEIVING WIRELESS SIGNAL IN WIRELESS COMMUNICATION SYSTEM

This application is the National Stage filing under 35 U.S.C. 371 of International Application No. PCT/KR2020/011246 filed on Aug. 24, 2020, which claims priority to Korean Patent Application No. 10-2019-0104011 filed on Aug. 23, 2019, the contents of which are all hereby incorporated by reference herein in their entirety.

TECHNICAL FIELD

The present disclosure relates to a wireless communication system, and more particularly, to a method and apparatus for transmitting and receiving wireless signals.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Task

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In a first technical aspect of the present disclosure, provided is a method of performing communication by a user equipment in a wireless communication system, the method including detecting an SS/PBCH (Synchronization Signal/Physical Broadcast Channel) block, the SS/PBCH block including a PBCH payload and a PBCH DMRS (Demodulation Reference signal) and based on characteristics of the PBCH DMRS, processing the PBCH payload on the basis of a WF (Waveform) of one of a plurality of WF schemes, wherein a plurality of the WF schemes may include a CP-OFDM (Cyclic Prefix Orthogonal Frequency Division Multiplexing) scheme and a DFT-s-OFDM (Discrete Fourier Transform-spread-OFDM) scheme at least.

In a second technical aspect of the present disclosure, provided is a user equipment used in a wireless communication system, the user equipment including at least one processor and at least one computer memory operably connected to the at least one processor and enabling the at least one processor to perform an operation when executed, the operation including detecting an SS/PBCH (Synchronization Signal/Physical Broadcast Channel) block, the SS/PBCH block including a PBCH payload and a PBCH DMRS (Demodulation Reference signal) and based on characteristics of the PBCH DMRS, processing the PBCH payload on the basis of a WF (Waveform) of one of a plurality of WF schemes, wherein a plurality of the WF schemes may include a CP-OFDM (Cyclic Prefix Orthogonal Frequency Division Multiplexing) scheme and a DFT-s-OFDM (Discrete Fourier Transform-spread-OFDM) scheme at least.

In a third technical aspect of the present disclosure, provided is an apparatus for a user equipment, the apparatus including at least one processor and at least one computer memory operably connected to the at least one processor and enabling the at least one processor to perform an operation when executed, the operation including detecting an SS/PBCH (Synchronization Signal/Physical Broadcast Channel) block, the SS/PBCH block including a PBCH payload and a PBCH DMRS (Demodulation Reference signal) and based on characteristics of the PBCH DMRS, processing the PBCH payload on the basis of a WF (Waveform) of one of a plurality of WF schemes, wherein a plurality of the WF schemes may include a CP-OFDM (Cyclic Prefix Orthogonal Frequency Division Multiplexing) scheme and a DFT-s-OFDM (Discrete Fourier Transform-spread-OFDM) scheme at least.

In a fourth technical aspect of the present disclosure, provided is a computer-readable storage medium comprising at least one computer program enabling at least one processor to perform an operation when executed, the operation including detecting an SS/PBCH (Synchronization Signal/Physical Broadcast Channel) block, the SS/PBCH block including a PBCH payload and a PBCH DMRS (Demodulation Reference signal) and based on characteristics of the PBCH DMRS, processing the PBCH payload on the basis of a WF (Waveform) of one of a plurality of WF schemes, wherein a plurality of the WF schemes may include a CP-OFDM (Cyclic Prefix Orthogonal Frequency Division Multiplexing) scheme and a DFT-s-OFDM (Discrete Fourier Transform-spread-OFDM) scheme at least.

Preferably, REs having the PBCH DMRS existing therein may have N RE (Resource Element) intervals in a frequency domain (where N is an integer greater than 1) and the characteristics of the PBCH DMRS may include a frequency shift value applied to the PBCH DMRS.

Preferably, the characteristics of the PBCH DMRS may include a parameter used to generate a DMRS sequence.

Preferably, the characteristics of the PBCH DMRS may include an initialization value used to generate the DMRS sequence.

Preferably, based on processing the PBCH payload according to the CP-OFDM scheme, a DFT size applied to the PBCH payload may be assumed as a value corresponding to a minimum band defined for a synchronization raster having the SS/PBCH block located thereat.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
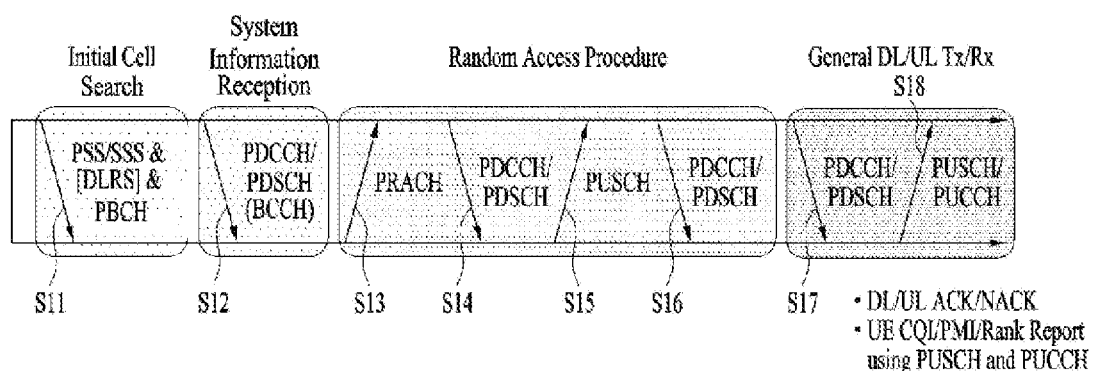
FIG. 1 illustrates physical channels used in a 3rd generation partnership project (3GPP) system as an exemplary wireless communication system, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
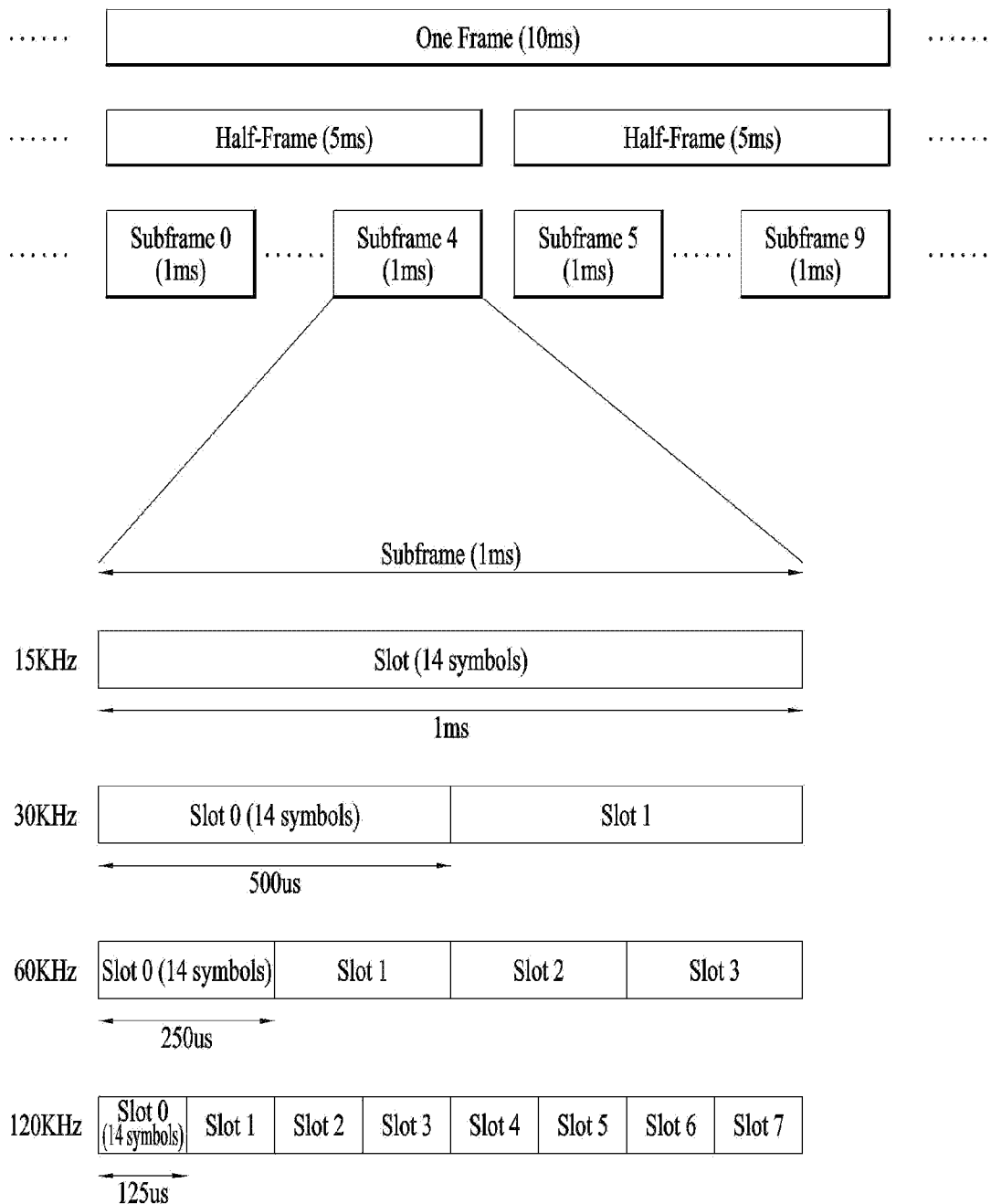
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2 $^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2 $^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

NR supports a multitude of numerologies (or subcarrier spacing (SCS)) to support various 5G services. For example, if SCS is 15 kHz, a wide area on traditional cellular bands is supported. If SCS is 30/60 kHz, dense-urban, lower latency and wider carrier bandwidth may be supported. If SCS is 60 kHz or higher, bandwidth greater than 24.25 GHz is supported to overcome phase noise.

NR frequency band is defined as frequency ranges of two types (FR1, FR2). FR1 and FR2 may be configured as Table 3 below. In addition, FR2 may mean millimeter Wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
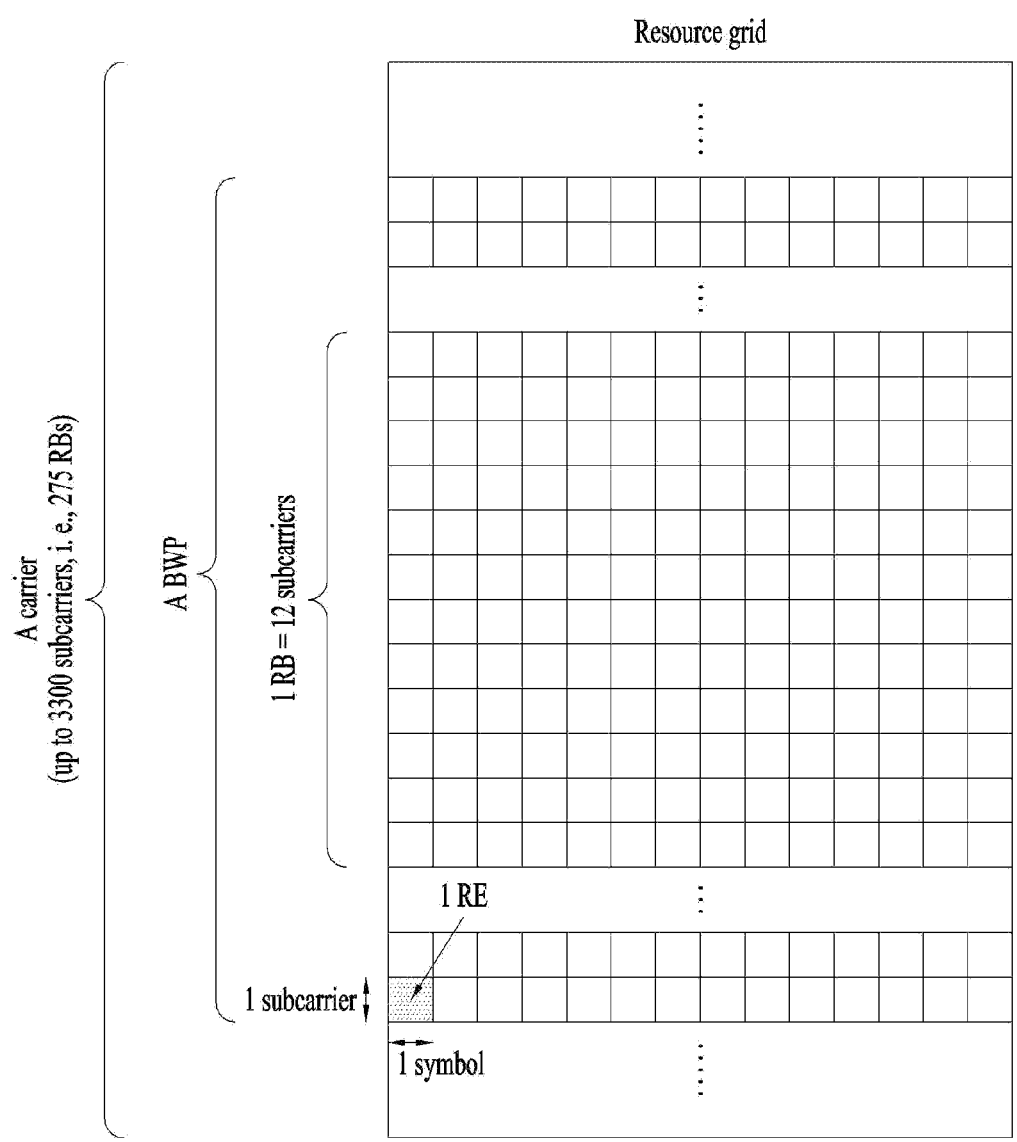
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
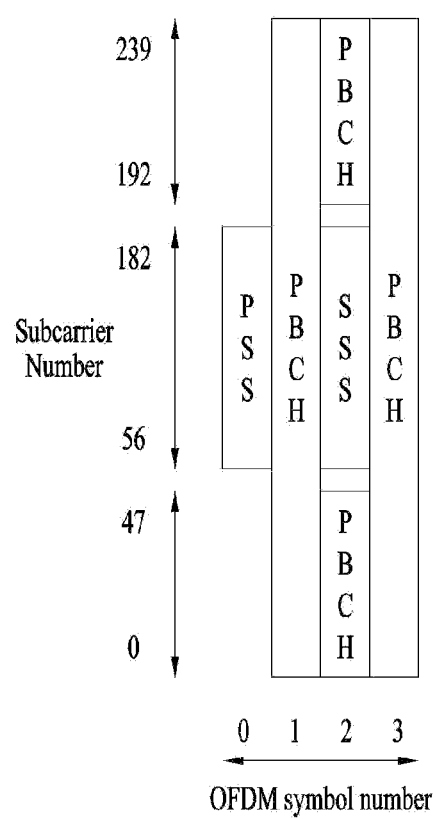
FIG. 4 and FIG. 5 illustrate the SSB (SS/PBCH) structure.

FIG. 4 illustrate a Synchronization Signal Block (SSB) structure. A UE may perform cell search, system information acquisition, beam alignment for initial access, DL measurement and the like based on an SSB. The SSB is interchangeably usable with a Synchronization Signal/Physical Broadcast Channel (SS/PBCH) block. The SSB includes PSS, SSS and PBCH. The SSB includes four contiguous OFDM symbols, and PSS, PBCH, SSS/PBCH and PBCH are transmitted per OFDM symbol. Each of the PSS and the SSS includes 1 OFDM symbol and 127 subcarriers, and the PBCH includes 3 OFDM symbols and 576 subcarriers. Polar coding and Quadrature Phase Shift Keying (QPSK) apply to the PBCH.

In a cell search process, a UE may obtain time/frequency synchronization of a cell and a cell Identifier (ID) (e.g., Physical layer Cell ID, PCID) of the corresponding cell. PSS is used to detect a cell ID in a cell ID group, and SSS is used to detect a cell ID group. PBCH is used for SSB (time) index detection and half-frame detection.

336 cell ID groups exist, and 3 cell IDs exist per cell ID group. Total 1,008 cell IDs exist, and the cell ID may be defined by Equation 1.

$$N^{cell}_{ID} = 3N^{(1)}_{ID} + N^{(2)}_{ID}, \qquad \text{[Equation 1]}$$

where $N^{(1)}_{ID} \in \{0, 1, \ldots, 335\}$ and $N^{(2)}_{ID} \in \{0, 1, 2\}$ Here, $N^{cell}_{ID}$ indicates a cell ID (e.g., PCID). $N^{(1)}_{ID}$ indicates a cell ID group and is provided/obtained via SSS. $N^{(2)}_{ID}$ indicates a cell ID in a cell ID group and is provided/obtained via PSS.

PSS sequence $d_{PSS}(n)$ may be defined to satisfy Equation 2.

$$dsss(n) = 1 - 2x(m) \qquad \text{[Equation 2]}$$

$m = \left(n + 43N^{(2)}_{ID}\right) \bmod 127, \ 0 \le n < 127,$ where $x(i + 7) = (x(i + 4) + x(i)) \bmod 2$ and, $[x(6)x(5)x(4)x(3)x(2)x(1)x(0)] = [1110110].$ SSS sequence $d_{SSS}(n)$ may be defined to satisfy Equation 3.

$$dsss(n) = [1 - 2x_0((n + m_0) \bmod 127)] \quad \text{[Equation 3]}$$

$$[1 - 2x_1((n + m_1) \bmod 127)]$$

$$m_0 = 15 * \text{flooring}\left(N_{ID}^{(1)}/112\right) + 5N_{ID}^{(2)}$$

$$m_1 = N_{ID}^{(1)} \bmod 112, \ 0 \le n < 127$$

$$x_0(i + 7) = (x_0(i + 4) + x_0(i)) \bmod 2$$

$$x_1(i + 7) = (x_0(i + 1) + x_1(i)) \bmod 2$$

$$[x_0(6)x_0(5)x_0(4)x_0(3)x_0(2)x_0(1)x_0(0)] = [0000001], \text{ and}$$

$$[x_1(6)x_1(5)x_1(4)x_1(3)x_1(2)x_1(1)x_1(0)] = [0000001].$$

Figure 5:
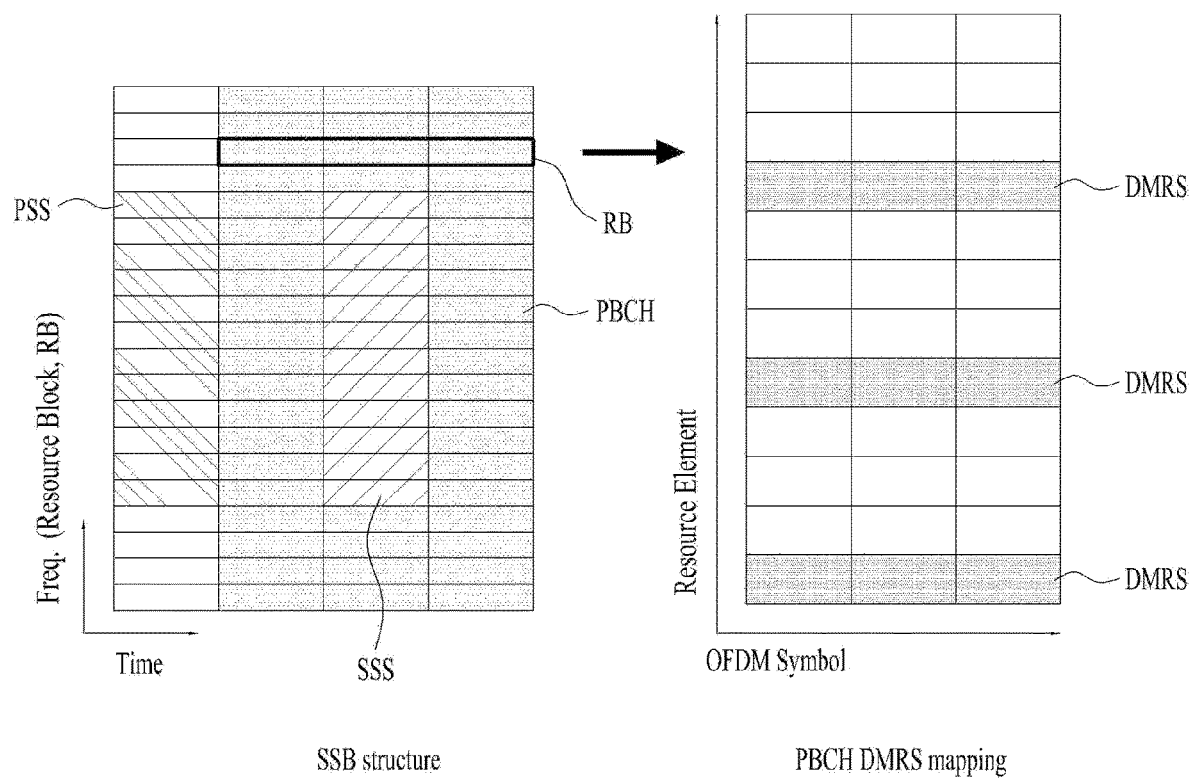

FIG. 5 illustrates the structure of PBCH DMRS (Demodulation Reference Signal) in SSB. Referring to FIG. 5, PBCH includes a dada RE and a DMRS (Demodulation Reference Signal) RE per OFDM symbol. 3 DMRS Res exist per RB, and 3 data Res exist between DMRS REs. A DMRS sequence includes a QPSK-modulated gold sequence.

Equation 5 illustrates a DMRS sequence.

$$r(m) = \frac{1}{\sqrt{2}}(1 - 2 \cdot c(2m)) + j\frac{1}{\sqrt{2}}(1 - 2 \cdot c(2m + 1)) \quad \text{[Equation 4]}$$

Here, c( ) is defined as a length-31 gold sequence of Equation 5.

$$c(n) = (x_1(n + N_C) + x_2(n + N_C)) \bmod 2 \quad \text{[Equation 5]}$$

$$x_1(n + 31) = (x_1(n + 3) + x_1(n)) \bmod 2$$

$$x_2(n + 31) = (x_2(n + 3) + x_2(n + 2) + x_2(n + 1) + x_2(n)) \bmod 2$$

Here, Nc=1600, and a first m-sequence $x_1(n)$ and a second m-sequence $x_2(n)$ are initialized as a value of Equation 6.

$$x_1(n) : x_1(0) = 1, \ x_1(n) = 0, \ n = 1, 2, \ldots, 30 \quad \text{[Equation 6]}$$

$$x_2(n) : c_{init} = \sum_{i=0}^{30} x_2(i) \cdot 2^i$$

Here, in case of PBCH DMRS, $c_{init}$ is defined by Equation 7.

$$c_{init} = 2^{11}(\bar{i}_{SSB} + 1)(\lfloor N_{ID}^{cell}/4 \rfloor + 1) + 2^6(\bar{i}_{SSB} + 1) + (N_{ID}^{cell} \bmod 4) \quad \text{[Equation 7]}$$

Here, $N^{cell}_{ID}$ indicates a (physical) cell ID and $\bar{i}_{SSB}$ indicates a 3-bit value related to an SSB index.

PBCH DMRS on each OFDM symbol in SSB is mapped as follows. A Symbol/subcarrier index may refer to FIG. 4.

TABLE 4

| | Symbol index in SSB | Subcarrier index in OFDM symbol |
|---|---|---|
| DM-RS for PBCH | 1, 3 | 0 + v, 4 + v, 8 + v, . . . , 236 + v |
| | 2 | 0 + v, 4 + v, 8 + v, . . . , 44 + v 192 + v, 196 + v, 236 + v |

Here, PBCH DMRS RE is frequency-shifted based on a cell ID. For example, it may be defined as $v_{shift}(v) = N^{cell}_{ID} \bmod 4$, where 'mod' indicates a modulo operation.

For the details of PBCH DMRS, 3GPP TS 38.211 Rel-15 (2019-12), Section 7.4.1.4 open to the public before a priority date of the present disclosure may be referred to.

A random access procedure is used for various usages. For example, a random access procedure may be used for network initial access, handover, and UE-triggered UL data transmission. A UE may obtain UL synchronization and UL transmission resource through the random access procedure. The random access procedure may be divided into a contention-based procedure and a non-contention based or dedicated procedure. The random access procedure is interchangeably used with a Random Access Channel (RACH) process.

Figure 6:
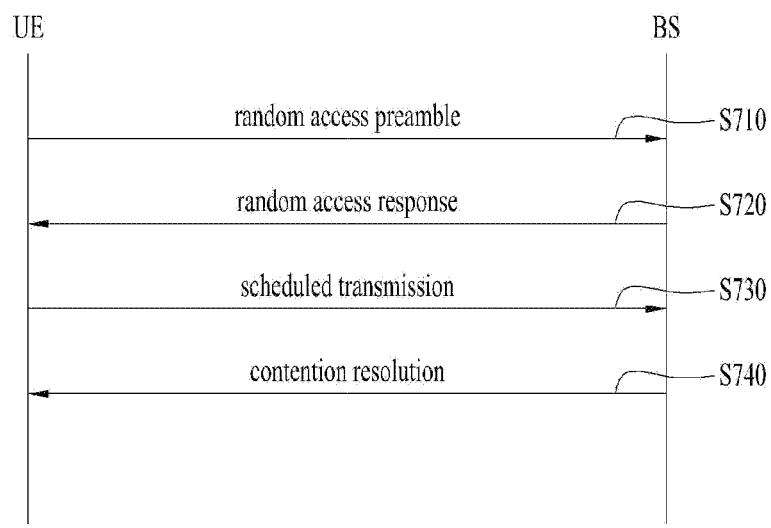
FIG. 6 illustrates a Random Access Channel (RACH) process.

FIG. 6 illustrates a contention-based random access procedure.

Referring to FIG. 6, a UE receives information on a random access from a Base Station (BS) over system information. Thereafter, if a random access is necessary, the UE transmits a random access preamble (message 1) to the BS [S710]. If receiving the random access preamble from the UE, the BS transmits a Random Access Response (RAR) message (message 2) to the UE [S720]. Specifically, scheduling information on the random access response message may be CRC-masked with a Random Access-RNTI (RA-RNTI) and then transmitted on an L1/L2 control channel (PDCCH). The PRCCH masked with RA-RNTI may be transmitted through a common search space only. If receiving a scheduling signal masked with RA-RNTI, the UE may receive the random access response message from PDSCH indicated by the scheduling information. Subsequently, the UE checks whether random access response information indicated to itself exists in the random access response message. Whether the random access response information indicated to the UE exists may be checked depending on whether a Random Access preamble ID (RAID) for the preamble transmitted by the UE exists. The random access response information includes timing offset information (e.g., Timing Advance Command (TAC)) for UL synchronization, UL scheduling information (e.g., UL grant), and UE temporary identification information (e.g., Temporary-C-RNTI, TC-RNTI). If receiving the random access response information, the UE transmits UL-Shared Channel (UL-SCH) data (message 3) on PUSCH according to the UL scheduling information [S730]. After receiving the UL-SCH data, the BS transmits a contention resolution message (message 4) to the UE [S740].

Figure 7:
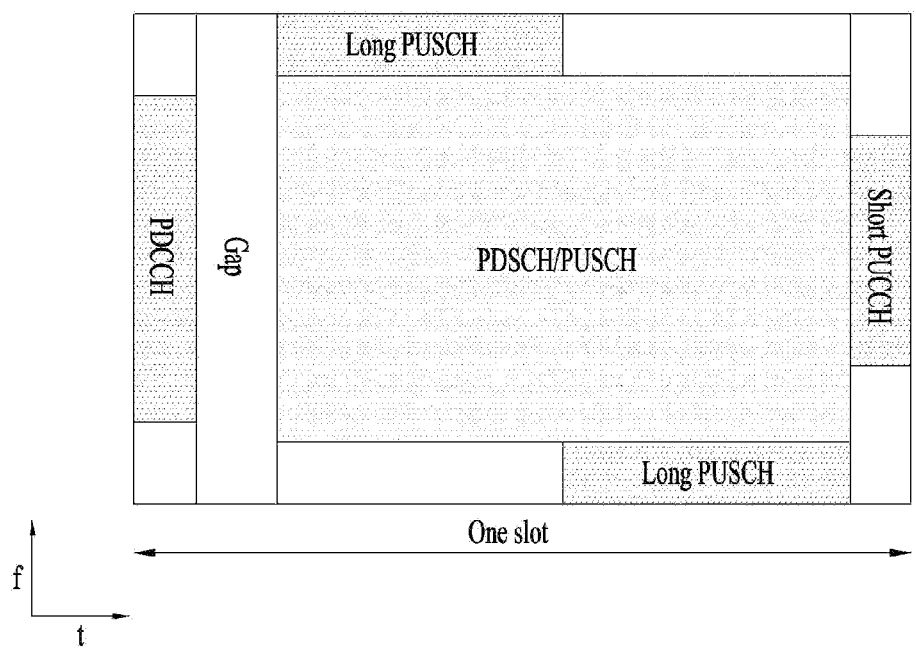
FIG. 7 illustrates an example of mapping a physical channel in a slot.

FIG. 7 illustrates an example of mapping a physical channel in a slot. In the NR system, a frame is characterized in having a self-complete structure that a DL control channel, DL or UL data, a UL control channel and the like may be included in a single slot. For example, first N symbols in a slot may be used in transmitting a DL control channel (e.g., PDCCH) [hereinafter, a DL control region], and last M symbols in the slot may be used in transmitting a UL control channel (e.g., PUCCH) [hereinafter, a UL control region]. Each of the N and the M is an integer equal to or greater than 0. A resource region (hereinafter, a data region) between the DL control region and the UL control region may be used for DL data (e.g., PDSCH) transmission or UL data (e.g., PUSCH) transmission. A GP provides a time gap in a process for a BS and a UE to switch to a Reception (Rx) mode from a Transmission (Tx) mode, and vice versa. Some symbols at the timing of switching from DL to UL in a subframe may be configured as a GP.

PDCCH carries Downlink Control Information (DCI). For example, PCCCH (i.e., DCI) carries transmission format and resource allocation of Downlink-Shared Channel (DL-SCH), resource allocation information on Uplink-Shared Channel (UL-SCH), paging information on Paging Channel (PCH), system information on DL-SCH, resource allocation information on a higher layer control message such as a random access response transmitted on PDSCH, transmission power control command, activation/release of Configured Scheduling (CS), etc.

Various DCI formats are provided according to information in DCI.

Table 5 illustrates DCI formats transmitted on PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

TABLE 6

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| C-RNTI | Dynamically scheduled unicast transmission | UL-SCH, DL-SCH |
| SFI (Slot Format Indication)-RNTI | Slot Format Indication on the given cell | N/A |

A modulation scheme of DCCH is fixed (e.g., Quadrature Phase Shift Keying (QPSK), and one PDCCH includes 1, 2, 4, 8, or 16 Control Channel Elements (CCEs) according to an Aggregation Level (AL). One CCE includes 6 Resource Element Groups (REGs). One REG is defined as one PFDMA symbol and one (P)RB. PDCCH is transmitted over a Control Resource Set (CORESET). CORESET corresponds to a physical resource/parameter set used in carrying PDCCH/DCI within a BWP. For PDCCH reception, a UE may perform monitoring (e.g., blind decoding) on a set of PDCCH candidates in CORESET. The PDCCH candidate indicates CCE(s) monitored by a UE for PDCCH reception/detection. PDCCH monitoring may be performed on one or more CORESETs on an active DL BWP on each activated cell having PDCCH monitoring configured therefor. The set of the PDCCH candidates monitored by the UE is defined as a PDCCH Search Space (SS) set. An SS set may include a Common Search Space (CSS) set of a UE-specific Search Space (USS) set.

Table 7 illustrates a PDCCH search space.

TABLE 7

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

DCI includes Cyclic Redundancy Check (CRC), and the CRC is masked/scrambled with various identifiers (e.g., Radio Network Temporary Identifier (RNTI)) according to an owner or usage of PDCCH. For example, if PDCCH is for a specific UE, CRC is masked with a UE identifier (e.g., Cell-RNTI (C-RNTI)). If PRCCH relates to paging, CRC is masked with Paging-RNTI (P-RNTI). IF PDCCH relates to system information (e.g., System Information Block (SIB)), CRC is masked with System Information-RNTI (SI-RNTI). If PDCCH relates to a random access response, CRC is masked with Random Access-RNTI (RA-RNTI).

Table 6 illustrates usages and transport channels of PDCCH according to RNTIs.

PUCCH carries Uplink Control Information (UCI). The UCI includes the following.
  SR (Scheduling Request): This is the information used to request a UL-SCH resource.
  HARQ-ACK (Hybrid Automatic Repeat reQuest-Acknowledgement): This is a response to a DL data packet (e.g., codeword) on PDSCH. This indicates whether a DL data packet is successfully received. In response to a single codeword, 1-bit HARQ-ACK may be transmitted. In response to two codewords, 2-bit HARQ-ACK may be transmitted. An HARQ-ACK response includes positive ACK (simply, ACK), negative ACK (NACK), DTX, or NACK/DTX. Here, HARQ-ACK is interchangeably used with HARQ ACK/NACK or ACK/NACK.

CSI (Channel State Information): This is information on a DL channel. MIMO (Multiple Input Multiple Output)-related feedback information includes a Rank Indicator RI) and a Precoding Matrix Indicator (PMI).

Table 8 illustrates PUCCH formats. They may be classified into short PUCCH (formats 0 and 2) and Long PUCCH (formats 1, 3 and 4) depending on PUCCH Tx lengths.

TABLE 8

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Figure 8:
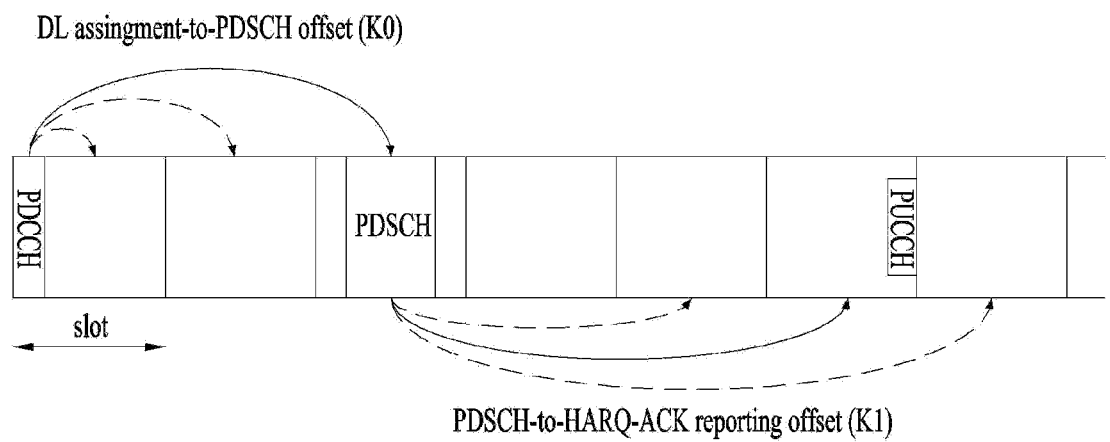
FIG. 8 illustrates an ACK/NACK transmitting process.

FIG. 8 illustrates an ACK/NACK transmitting process. Referring to FIG. 8, a UE may detect PDCCH in slot #n. Here, the PDCCH includes DL scheduling information (e.g., DCI formats 1_0 and 1_1) and indicates DL assignment-to-PDSCH offset (K0) and PDSCH-HARQ-ACK reporting offset (K1). For example, DCI formats 1_0 and 1_1 may include the following information.

Frequency domain resource assignment: This indicates an RB set assigned to PDSCH.

Time domain resource assignment: K0, this indicates the start position (e.g., OFDM symbol index) and length (e.g., OFDM symbol number) of PDSCH in slot.

PDSCH-to-HARQ_feedback timing indicator: This indicates K1.

HARQ process number (4 bits): This indicates an HARQ process ID (Identify) for data (e.g., PDSCH, TB).

PUCCH resource indicator (PRI): This indicates a PUCCH resource to be used for UCI transmission among a plurality of PUCCH resources in a PUCCH resource set.

Thereafter, the UE may receive PDSCH in slot #(n+K0) according to scheduling information of the slot #n and then transmit UCI on PUCCH in slot #(n+K1). Here, the UCI includes an HARQ-ACK response to the PDSCH. If the PDSCH is configured to transmit maximum 1 TC, the HARQ-ACK response may be configured with 1 bit. If the PDSCH is configured to transmit maximum two TBs, the HARQ-ACK response may be configured with 2 bits when spatial bundling is not configured, or 1 bit when spatial bundling is configured. If an HACK-ACK transmission timing for a plurality of PDSCHs is designated as slot #(n+K1), UCI transmitted in the slot #n(n+K1) includes an HACK-ACK response to a plurality of the PDSCHs.

Figure 9:
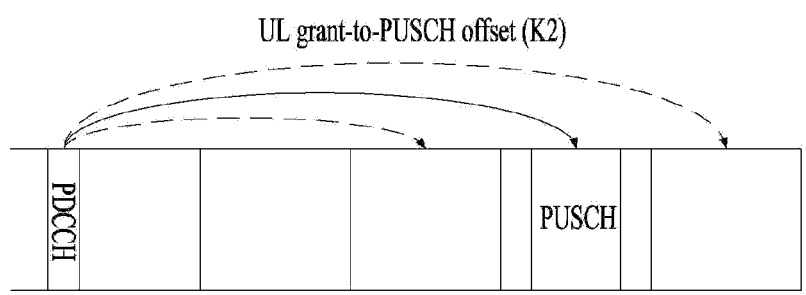
FIG. 9 illustrates a PUSCH (Physical Uplink Shared Channel) transmitting process.

FIG. 9 illustrates a PUSCH transmitting process. Referring to FIG. 9, a UE may detect PDCCH in slot #n. Here, the PDCCH includes UL scheduling information (e.g., DCI formats 0_0 and 0_1). Here, the DCI formats 0_0 and 0_1 may include the following information.

Frequency domain resource assignment: This indicates an RB set assigned to PUSCH.

Time domain resource assignment: Slot offset K2, this indicates a start position (e.g., symbol index) and length (e.g., OFDM symbol number) of PUSCH in slot. The start symbol and length may be indicated via SLIV (Start and Length Indicator Value) or indicated respectively.

Thereafter, the UE may transmit PUSCH in slot #(n+K2) according to scheduling information of the slot #n. Here, the PUSCH includes UL-SCH TB. If a PUCCH Tx timing and a PUSCH Tx timing overlap with each other, the UCI may be transmitted on the PUSCH (PUSCH piggyback).

Embodiment: Downlink Waveform

In the legacy LTE/NR system, DL transmission is performed based on OFDM/OFDMA (e.g., Cyclic Prefix-OFDM (CP-OFDM)) and UL transmission is performed based on DFT-s-OFDM (or Single Carrier-OFDM (SC-OFDM), SC-FDMA) (CP-OFDM based UL transmission is added to the NR system). Namely, owing to the property of an uplink having a relatively low transmission power compared to a BS, it is advantageous in that a UL coverage can be extended by applying DFT-s-OFDM having a low Peak-to-Average Power Ratio (PAPR).

Figure 10:
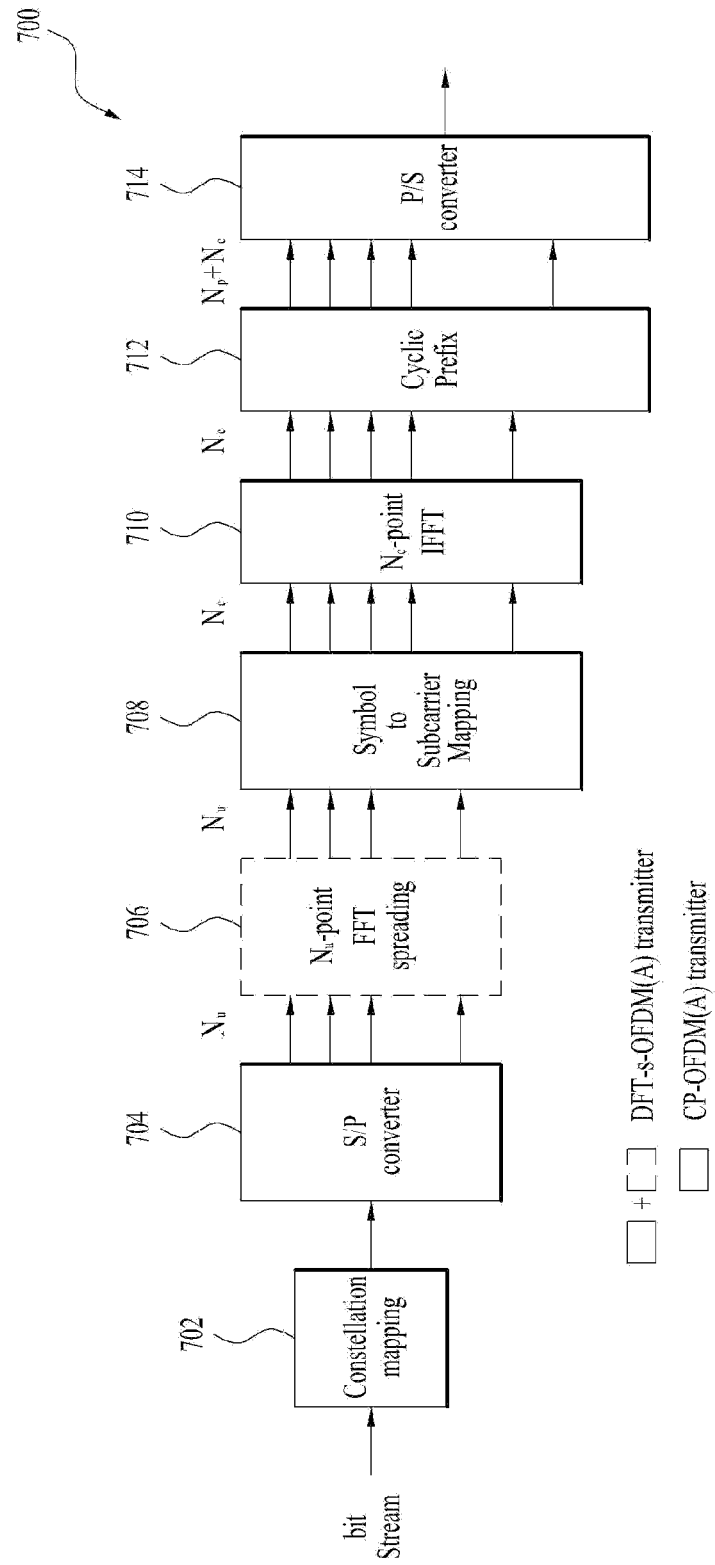
FIG. 10 and FIG. 11 illustrate the structure of a transmitter/receiver.
Figure 11:
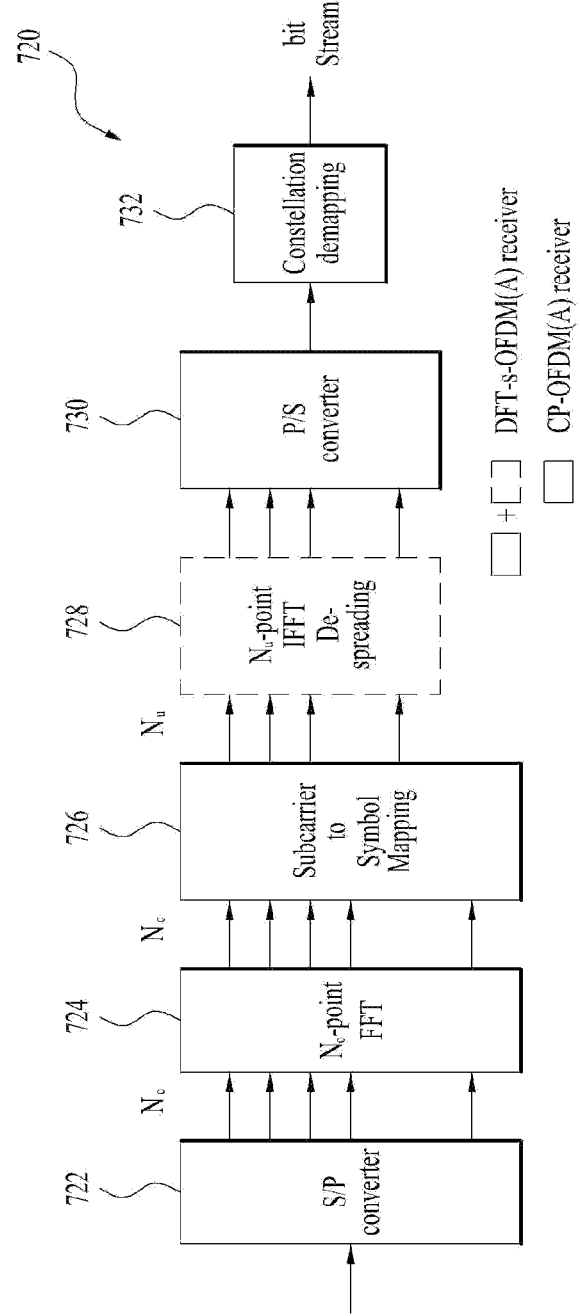

FIG. 10 and FIG. 11 illustrate the transmitter and receiver structures. In the transmitter structure, DFT-s-OFDM(A) scheme differs from OFDM(A) scheme in applying a DFT precoding 706 before an IFFT processing 710. In the receiver structure, DFT-s-OFDM(A) scheme differs from OFDM(A) scheme in applying a postcoding 728 before an FFT processing 724. The signal processing in FIG. 10 and FIG. 11 is described with reference to the DFT-s-OFDM(A) scheme and corresponds to the OFDM(A) scheme if omitting the signal processing 706/728 denoted by a dotted line.

Referring to FIG. 10, a bitstream is modulated into a data symbol sequence [702]. Subsequently, the serial data symbol sequence is converted into Nu parallel sequences each [704]. The Nu-length parallel data symbol sequence is transformed into an Nu-length frequency domain sequence [706]. By processing a signal by DFT of the same size of the data symbol sequence, the data symbol sequence is converted into a sequence continuous in a frequency domain. The FFT processing may be performed through Nu-point DFT processing. In the present disclosure, FFT is interchangeably used with DFT, and DFT processing is interchangeably used with DFT spreading or DFT precoding. Thereafter, the Nu-length frequency domain sequence is mapped to Nu subcarriers allocated among total Nc subcarriers, and the remaining (Nc-Nu) subcarriers are padded with zeros [708]. The sequence mapped to Nc subcarriers is transformed into an Nc-length time domain sequence through Nc-point IFFT processing [710]. To reduce ISI and ICI, a CP is configured in a manner of copying Np samples at the very last in the time domain sequence and adding them to at the very front of the sequence [720]. The generated time domain sequence corresponds to a single Tx symbol and is converted into a serial sequence through a Parallel/Serial (P/S) converter [714]. Thereafter, the serial sequence is transmitted to a receiving end via processes such as frequency upconverting and the like. Another user transmits data in a manner of receiving allocation of available subcarriers among the (Nc-Nu) subcarriers remaining after being used by a former user.

Referring to FIG. 11, a receiving end 720 includes a Serial/Parallel (S/P) converter 722, an Nc-point FFT module 724, a subcarrier-to-symbol mapping module 726, an Nu-point DFT de-spreading module 728, a P/S converter 730, and a constellation demapping module 732. Since a signal processing process of the receiving end 720 is configured in a reverse manner of the transmitting end 700, details refer to FIG. 10.

Meanwhile, as a frequency band that considers an operation of an NR system gets higher (e.g., above 52.6 GHz), applying a waveform having a low PAPR to a downlink is being considered in consideration of Power Amplifier (PA) linearity and the like from the perspective of a BS as well as a UE. As an example of a waveform having a low PAPR in comparison to the conventionally applied CP-OFDM, DFT-s-OFDM may be considered. A DFT-s-OFDM operation considered in the present specification may be as follows.

Figure 12:
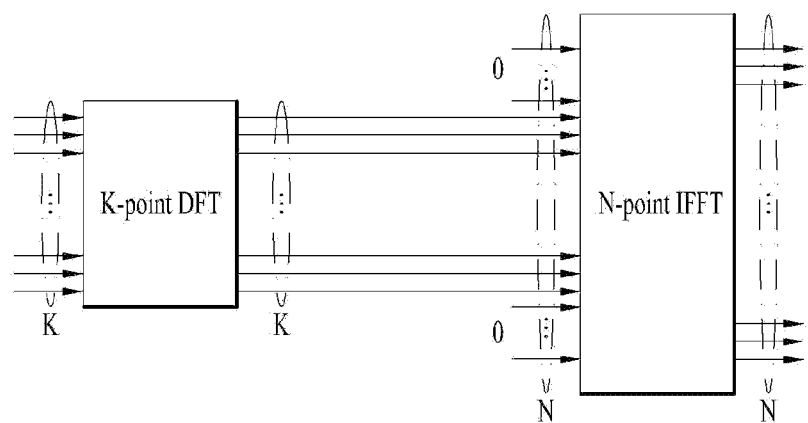
FIGS. 12 to 14 illustrate DFT-s-OFDM (Discrete Fourier Transformation-spread-Orthogonal Frequency Division Multiplexing) processing.

Like the example of FIG. 12, by performing zero-padding on an IFFT front end after taking DFT on K input signals/samples (K-point DFT, see 706 in FIG. 10), N-point IFFT may be performed (i.e., N>K or N=K). For convenience, a DFT rear end or an IFFT front end may be referred to understood as an f-domain (i.e., frequency-domain), a DFT front end (or a pre-DFT) may be referred to understood as a virtual time domain sample, and an IFFT rear end may be referred to understood as a time domain signal.

Figure 13:
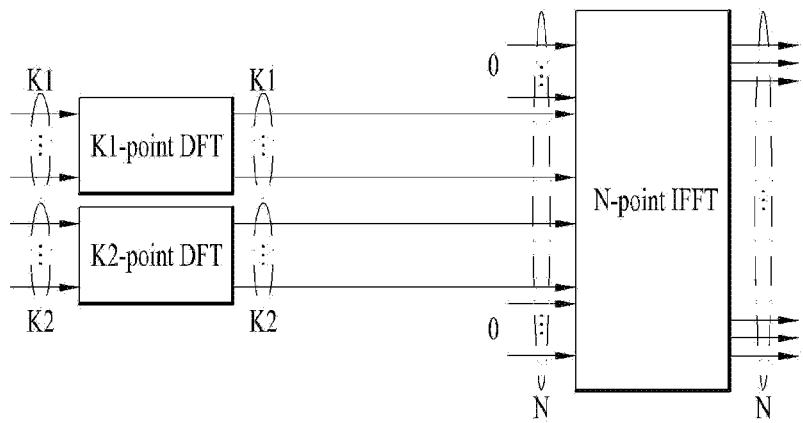
Figure 14:
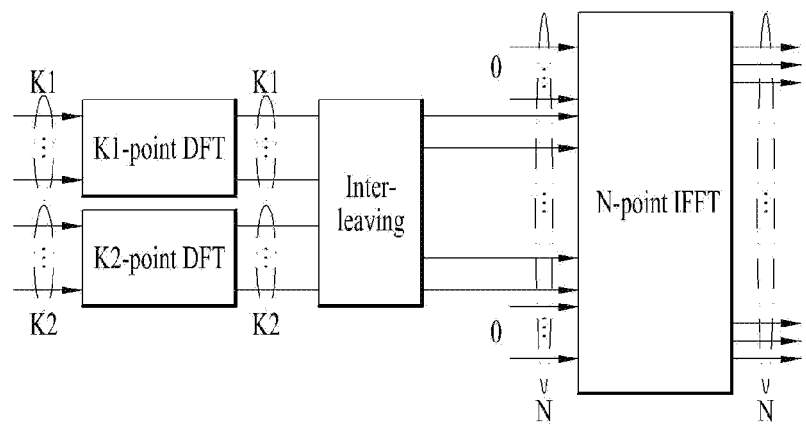

In addition, the number of DFT blocks corresponding to one IFFT block (N-point IFT, see 710 in FIG. 10) may be plural. As shown in FIG. 13, after performing K1-point DFT and K-2 point DFT on K1 samples and K2 samples (e.g., K1=K2 or K1 may be different from K2) in a virtual time domain, respectively, the generated K1 and K2 samples may be continuously mapped in an f-domain. Alternatively, as shown in FIG. 14, K1 samples and K2 samples may be mapped in an f-domain so as to be interleaved by a specific rule (e.g., K1 samples and K2 samples are mapped to even indexes and odd indexes, respectively). Although FIG. 13 and FIG. 14 illustrate two DFT blocks, the method/rule proposed in the present specification may exactly apply to the case of using three or more DFT blocks.

For clarity, in the present specification, a high frequency band above 52.6 GHz is defined as FR4. A BS operated on FR4 band may have a DL WF preferred according to a situation among a plurality of DL WaveForm (WF) candidates in consideration of a cell coverage, the number of associated users in a cell, base station implementation complexity/costs and the like.

Hereinafter, when a plurality of DL WFs supported by a BS/UE can be defined, a method of indicating that a downlink is transmitted based on which DL WF is proposed in the present specification. In addition, a DL WF checking method in an initial access procedure and a DL signal multiplexing method in consideration of a DL WF are proposed in the present specification. For convenience, of the following description, a DL WF may be simply referred to as a WF.

In a situation that a plurality of DL WFs are defined/supported, the proposed method in the present specification is applicable irrespective of a frequency band. Preferably, the proposed method in the present specification may be limitedly applicable to a case of operating on a high frequency band (e.g., 52.6 GHz or higher) only.

For convenience, the proposed method in the present specification is described on the assumption of two DL candidate WFs (e.g.: (1) CP-OFDM and (2) different WF; (1) CP-OFDM and (2) DFT-s-OFDM; or (1) CP-OFDM and (2) single-carrier-type WF not based on (I-)DFT/(I-)FFT application. Yet, the proposed method in the present specification may be extended and applied to a case that there are three or more Candidate-WFs (C-WFs).

Figure 15:
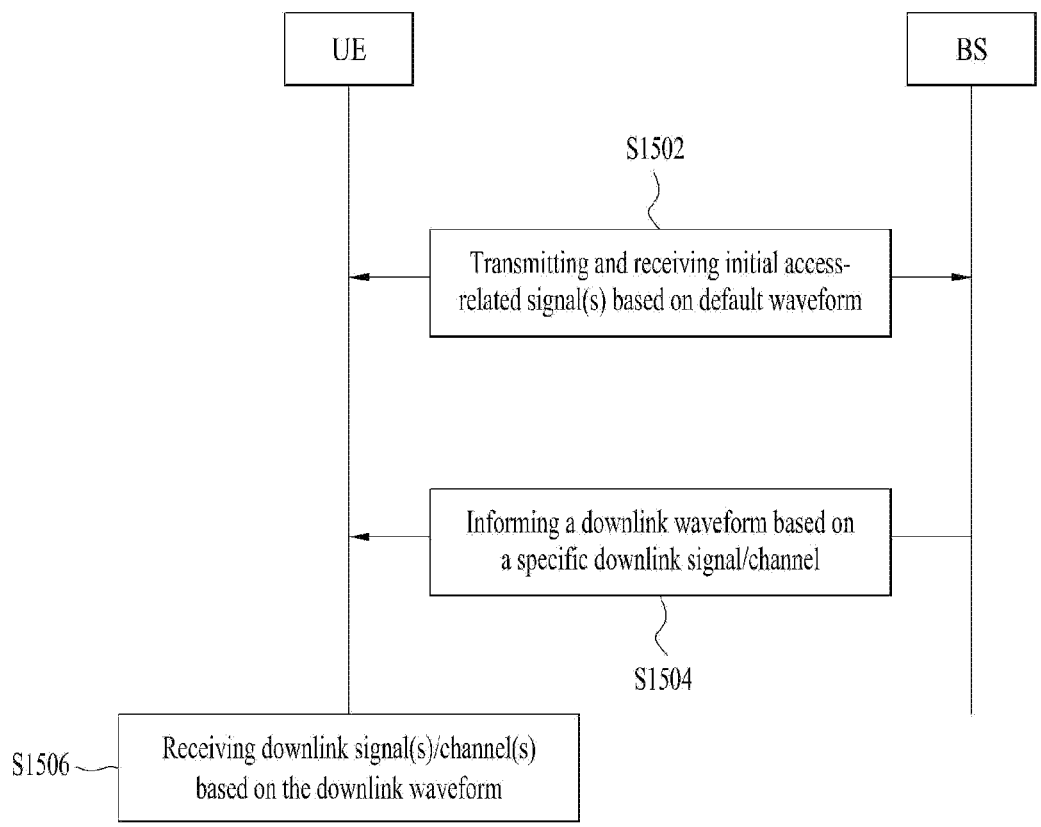
FIG. 15 and FIG. 16 illustrate a signal transmitting/receiving process according to the present disclosure.

FIG. 15 illustrates a signal transmitting and receiving method according to one embodiment of the present disclosure. Referring to FIG. 15, a BS/UE attempting an initial access (on FR4 cell) may transmit/receive a DL signal on the assumption of a DL Default WF (D-WF) [S1502]. In addition, the UE may receive configuration of a DL Operating WF (O-WF) through a specific DL signal and/or channel [S1504]. Based on the O-WF, the UE may receive a subsequent DL signal and/or channel [S1506]. Namely, the B may transmit a DL signal and/or channel on the D-WF until the O-WF is indicated, and the UE may receive the DL signal and/or channel on the assumption of the D-WF until the O-WF is signalled to the UE. Moreover, if the O-WF is indicated through a specific DL signal and/or channel (CH #1), the UE may receive a DL signal and/or channel (CH #2) through the indicated O-WF after the reception of the CH #1. In this case, if (1) the D-WF and (2) the indicated O-WF are the same, the UE may be capable of reception continuously without a gap between the CH #1 reception and the CH #2 receivable timing. On the other hand, if (1) the D-WF and (2) the indicated O-WF are different from each other, the UE may be capable of CH #2 reception based on the indicated O-WF after a specific timing gap (predefined or reported by the UE) between the CH #1 reception and the CH #2 receivable timing.

WF Indicating Method

[Method #1] PSS and/or SSS and/or PBCH DM-RS based O-WF indicating method

[Method #1-1] Method of utilizing a sequence type: A PSS and/or SSS and/or PBCH DM-RS sequence may be divided into a plurality of sets (e.g., 2 sets) or sequence generation parameter(s) may be divided into a plurality of sets (e.g., 2 sets). By predefining the relation between each C-WF and a corresponding set and signaling a sequence belonging to or based on a specific set thereof, a BS may inform a UE of a C-WF corresponding to an O-WF among a plurality of C-WFs. For example, a PSS (and/or an SSS) may divide an available N_id value into 2 sets or a PBCH DM-RS may device a parameter on a scrambling sequence generator into 2 sets. For example, Equation 1 may be modified as follows.

$$N_{ID}^{cell} = 3N_{ID}^{(1)} + N_{ID}^{(2)},$$ [Equation 8]

where $N^{(1)}_{ID} \in \{N^{(1)}_{ID\_WF1}, N^{(1)}_{ID\_WF2}\}$ and/or $N^{(2)}_{ID} \in \{N^{(2)}_{ID\_WF1}, N^{(2)}_{ID\_WF2}\}$.

$N^{(1)}_{ID}$ and $N^{(2)}_{ID}$ may have the same range of the previous or may be extended more than the previous to distinguish a WF. For example, a maximum value of $N^{(1)}_{ID}$ may be extended to the multiple of 355 (e.g., 355*2). Moreover, a maximum value of $N^{(2)}_{ID}$ may be extended to a value greater than 3 (e.g., 4). If a maximum value of $N^{(2)}_{ID}$ is extended to M (3>), a coefficient of $N^{(1)}_{ID}$ in Equation 8 is changed into M.

Alternatively, a BS may define a separate signal for indicating an O-WF and then inform a UE of a C-WF corresponding to the O-WF among C-WFs based on a sequence or a sequence generation parameter of the corresponding signal. For example, Equation 7 may be changed as follows.

$$2^{x*}WF + 2^{11}(\bar{i}_{SSB} + 1)(\lfloor N_{ID}^{cell}/4 \rfloor + 1) + \\ 2^6(\bar{i}_{SSB} + 1) + (N_{ID}^{cell} \bmod 4)$$  [Equation 9]

Here, x is an integer equal to or greater than 12 and a WF indicates a value corresponding to an O-WF among a plurality of C-WFs.

[Method #1-2] A method of utilizing a sequence transmitted resource location: For one example, a BS may predefine a C-WF corresponding per synchronization raster (or, Global Synchronization Channel Number (GSCN)) and then inform a UE of a C-WF corresponding to an O-WF among C-WFs based on that a PSS and/or SSS and/or PBCH DM-RS corresponds to which synchronization raster. For another example, a BS may inform a UE which one of C-WFs is used as an O-WF by utilizing relative resource location/information between PSS and/or SSS and/or PBCH DM-RS (on frequency and/or time). Specifically, it is able to utilize resource information such as a distance between PSS symbol and SSS symbol, a distance between PSS and/or SSS symbols and PBCH DM-RS symbol, a distance between a specific (e.g., the smallest or greatest) RB index among PSS mapped RBs and a specific (e.g., the smallest or greatest) RB index among PSS mapped RBs, a distance between a specific (e.g., the smallest or greatest) RB index among PSS and/or SSS mapped RBs and a specific (e.g., the smallest or greatest) RB index among PBCH DM-RS mapped RBs, a v_shift value applied to PBCH DM-RS and the like. For example, a BS/UE may indicate/obtain a C-WF corresponding to an O-WF among a plurality of C-WFs according to the corresponding resource information. For example, $v_{shift}$ (v) in Table 4 may be changed as follows: $v_{shift}$ (v)=(M*$N^{cell}_{ID}$+WF) mod 4. Here, M is the number of C-WFs and WF indicates an index of a C-WF corresponding to an O-WF (0~M−1).

Particularly, if a structure that a PBCH DM-RS and a PBCH payload are mapped to or transmitted in the same symbol, a PBCH DM-RS location needs to be fixed in a specific domain (e.g., f-domain) irrespective of a WF of the PBCH payload. Namely, as the WF of the PBCH payload is changed, if the PBCH DM-RS location is changed as well, PBCH reception complexity increases. For example, when a PBCH payload and a PBCH DM-RS are transmitted in a symbol, in which the PBCH payload and the PBCH DM-RS are transmitted, on Q1 REs in f-domain,

- Q1-point DFT is performed on the PBCH payload, DFTed PBCH payload symbols are mapped to Q1 subcarriers in the f-domain, performing puncturing on a subcarrier #n corresponding to the PBCH DM-RS location, and the PBCH DM-RS is mapped to the subcarrier #n (i.e., performing puncturing on the subcarrier #n corresponding to the PBCH DM-RS location in the f-domain), or
- when the PBCH DM-RS RE number is Q2, (Q1-Q2)-point DFT is performed on the PBCH payload, (Q1-Q2) DFTed payload symbols are mapped in a manner of avoiding the subcarrier #n corresponding to the PBCH DM-RS location in the f-domain, and the PBCH DM-RS may be mapped to the subcarrier #n (i.e., rate-matching is performed on the PBCH payload to match the (Q1-Q2) REs resource).

Alternatively, as a WF of a PBCH payload is changed, if PBCH DM-RS mapping is changed, neighbor cell RRM measurement of a UE and the like may be difficult. Hence, a WF of a PBCH payload and/or PBCH DM-RS mapping related information transmitted on a cell corresponding to a neighbor cell ID may be included in information for neighbor cell RRM measurement (e.g., measurement object on system information). Alternatively, when SCell (or PSCell) addition is configured for a serving cell on FR4 (if FR4 cell operates in non-stand-alone mode only), an O-WF for the serving cell may be indicated over higher layer signaling (e.g., RRC signaling).

[Method #2] Method of indicating an O-WF over PBCH payload or SIB1 PDCCH/PDSCH

Over PBCH payload, SIB1 PDCCH (i.e., PDCCH scheduling PDSCH including SIB1) or PDSCH including SIB1, a BS may signal an O-WF corresponding to a DL signal and/or channel, which will be received later, to a UE within a corresponding DL CC.BWP. For one example, if an O-WF is indicated over a PBCH payload, the UE may assume an O-WF indicated from a DL signal or channel (e.g., SIB1 PDCCH/PDSCH, etc.), which will be received thereafter, and then receive the corresponding DL signal and/or channel In this case, the UE may perform a reception operation by assuming a D-WF for a previous DL transmission, including PBCH. For another example, if an O-WF is indicated over SIB1 PDCCH, the UE may assume an O-WF indicated from a DL signal or channel (e.g., SIB1 PDSCH, etc.), which will be received thereafter, and then receive the corresponding DL signal and/or channel In this case, the UE may perform a reception operation by assuming a D-WF for a previous DL transmission, including SIB1 PDCCH. For further example, if an O-WF is indicated over SIB1 PDSCH, the UE may assume an O-WF indicated from a DL signal or channel (e.g., a cell-common RRC signal such as SIB2 and the like, a paging signal, etc.), which will be received thereafter, and then receive the corresponding DL signal and/or channel In this case, the UE may perform a reception operation by assuming a D-WF for a previous DL transmission, including SIB1 PDSCH.

[Method #3] Method of indicating an O-WF over a cell-common RRC signal and/or a UE-specific RRC signal Over PDSCH including a cell-common RRC signal (not SIB1) and/or a UE-specific RRC signal and/or PDCCH scheduling the corresponding PDSCH, a BS may signal an O-WF corresponding to a DL signal and/or channel, which will be received thereafter, to a UE within a corresponding DL CC/BWP.

[Method #4] Method of indicating an O-WF over a DL signal/channel associated with a paging and/or RACH process Over PDSCH (e.g., RAR message, msg4, etc.) associated with a paging and/or RACH process and/or PDCCH (e.g., PDCCH scrambled with RA-RNTI) scheduling the corresponding PDSCH, a BS may signal an O-WF corresponding to a DL signal and/or channel, which will be received thereafter, to a UE within a corresponding DL CC/BWP. Meanwhile, after reception of PDSCH (e.g., msg4) in the RACH process, depending on a type of an O-WF signaled in the associated PUCCH (e.g., A/N for msg4) transmission, a (slot level) HARQ timing value between the PDSCH and the PUCCH may be interpreted differently. For one example, when a code point of an HARQ timing field indicated by DCI, which schedules a msg4, is '000', if an O-WF is CP-OFDM, an HARQ timing value between (i) PDSCH and (ii) corresponding PUCCH may be defined to be recognized as n1 slot. If an O-WF is DFT-s-OFDM, an HARQ timing value between (i) PDSCH and (ii) corresponding PUCCH may be defined to be recognized as n2 slot (e.g., n2>n1). For another example, when a code point of an HARQ timing field indicated by DCI, which schedules a msg4, is '000', an HARQ timing value between (i) PDSCH and (ii) corresponding PUCCH may be recognized identically irrespective of an O-WF (e.g., n1). Instead, a PUCCH minimum processing time for the O-WF may be defined differently. For example, a PUCCH minimum processing time of a case that an O-WF is CP-OFDM may be set shorter than a minimum processing time if a case that an O-WF is DFT-s-PFDM. A PUCCH minimum processing time means a minimum processing time necessary to prepare a PUCCH transmission from a PDSCH Rx timing. For example, a PUCCH minimum processing time may mean a minimum time interval between a PDSCH last symbol and a PUCCH first symbol and may be defined as (N+d)*Ts. Here, N indicates the symbol number corresponding to a PUCCH minimum processing time, d indicates an offset value equal to or greater than 0, and Ts indicates a time length of a symbol. In case that an O-WF is CP-OFDM, it may be defined as N=n1. In case that an O-WF is DFT-s-OFDM, it may be defined as N=n2, (N2>N1). If a PUCCH minimum processing time is secured, a UE may normally perform a PUCCH transmission. On the contrary, if the PUCCH minimum processing time is not secured, the UE may skip the PUCCH transmission.

Here, the HARQ timing and/or the PUCCH minimum processing time may apply to a general signal transmitting process as well as to the RACH process.

DFT Size Assumption in an Initial Access Procedure

In the present section, assuming a case that a WF corresponding to a PBCH payload and/or SIB1 is DFT-s-OFDM in an initial access procedure, (1) a method of receiving a PBCH payload and/or SIB1 and (2) a method of transmitting/receiving a different DL signal and/or channel multiplexed with the same DFT-s-OFDM symbol of a PBCH payload and/or SIB1 are proposed. In this case, the DFT-s-OFDM applied to the PBCH payload and/or SIB1 may be a D-WF or an O-WF pre-indicated by a BS.

[Method #A] Assuming Method for a DFT Size on PBCH Payload Reception

A DFT size applied to a PBCH payload may be assumed as one of the followings.

1) When PBCH is mapped/transmitted over (maximum) X RBs/REs on a F-domain in a PBCH transmitted DFT-s-OFDM symbol, the number of subcarriers corresponding to X RBs/REs.

2) A minimum BW a UE should have during an operation on FR4 (here, the minimum BW may mean the subcarrier number corresponding to the valid RB/RE number on a corresponding frequency band (e.g., a frequency band corresponding to Y MHz) except a guard band.)

3) A minimum BW a UE should have, defined per synchronization raster on each FR4 (here, the minimum BW may mean the subcarrier number corresponding to the valid RB/RE number on a corresponding frequency band (e.g., a frequency band corresponding to Y MHz) except a guard band.)

In this case, a BS, which transmits PBCH, may perform PBCH transmission in a DFT-s-OFDM symbol by configuring a DFT block (=N RBs/REs) corresponding to one of 1), 2), or 3). Moreover, a UE, which receives the PBCH, may attempt PBCH reception in the corresponding DFT-s-OFDM symbol on the assumption of the DFT block (=N RBs/REs) corresponding to one of 1), 2), or 3). Here, the assumption for a DFT size of a PBCH payload may apply to an initial access procedure limitedly. For example, the UE obtains information on an actual DFT size of a PBCH payload from the BS over UE-common configuration information (e.g., system information), and may perform PBCH detection/reception operation based on the obtained information.

[Method #B] Multiplexing Method of a PBCH Symbol and a DL Channel Transmitted in the Same (DFT-s-OFDM) Symbol When both (1) PBCH and (ii) mux (or multiplexed) DL channel, which are scheduled/assigned to the same symbol, are based on DFT-s-OFDM, a single or plurality of DFT blocks are configured only with the rest of (K-N) RBs resulting from excluding N RBs (here, N RBs may be the RB number corresponding to a PBCH Tx band in [Method #A]) among total K RBs (here, K RBs may be the RB number corresponding to a band configured on a corresponding CC/BWP) of the corresponding symbol (hereinafter, Mux DFT-s-OFDM symbol), whereby a DL channel (e.g., PDCCH, PDSCH) may be transmitted/received. For example, in FIG. 13 and FIG. 14, the K1 value is the RE number corresponding to N RBs and the K2 value is the RE number corresponding to (K-N) RBs, and a DL channel may be transmitted/received based on the plural DFT block structure. Here, Mux DFT-s-OFDM symbol means DFT-s-OFDM symbol in which simultaneous transmission of PBCH and other DL channel(s) is scheduled/assigned. Meanwhile, a BS failing to transmit a plurality of DFT blocks may not transmit a DL channel except PBCH in a Mux DFT-s-OFDM symbol (or a slot to which the Mux DFT-s-OFDM symbol belongs). Hence, a UE may not expect reception of a DL channel (e.g., PDCCH, PDSCH) except PBCH in the Mux DFT-s-OFDM symbol (or the slot to which the Mux DFT-s-OFDM symbol belongs). For example, in a Mux DFT-s-OFDM symbol (or a slot to which the Mux DFT-s-OFDM symbol belongs), a UE may omit/skip a process for receiving a DL channel (e.g., PDCCH, PDSCH) except PBCH. Alternatively, a UE unable to support plural-DFT block based DL signal reception may not expect reception of DL channel except PBCH in a Mux DFT-s-OFDM symbol, or may selectively receive only a DL signal corresponding to a DFT block of one of PBCH and DL channel (e.g., PDCCH, PDSCH) (based on UE implementation).

In some implementations, when WFs of (1) PBCH and (ii) DL channel, which are scheduled/assigned to the same symbol/slot are possibly different from each other (e.g., DFT-s-OFDM based PBCH and CP-OFDM based DL channel), in a PBCH transmitted symbol and/or a slot (including the PBCH transmitted symbol), a UE may not expect the corresponding DL channel reception. Hence, in the corresponding symbol and/or slot, the UE may omit/skip the reception process (e.g., demapping, decoding) of the DL channel (e.g., PDCCH, PDSCH). Alternatively, in a PBCH transmitted symbol and/or a slot (including the PBCH transmitted symbol), a UE may assume that a WF of DL channel follows PBCH (irrespective of a WF indicated/configured for the DL channel). To support such a UE operation at least, a WF of a DL channel may be dynamically indicated over PDCCH. Alternatively, in receiving a DL channel, a presence or non-presence of mux of PBCH and DL channel may be signaled in a symbol, in which the corresponding DL channel is transmitted, and/or a slot (including the corresponding DL channel transmitted symbol).

[Method #C] Assuming Method for a DFT Size on SIB1 Reception

By separately configuring N RBs sized DFT blocks corresponding to a BW (=N RBs) of an initial active DL BWP indicated on PBCH, SIB1 PDCCH may be transmitted. Alternatively, aside from the RB number corresponding to the initial active DL BWP over PBCH, a BS may directly signal a DFT size (=N RBs) a UE will assume for SIB1 PDCCH reception.

Alternatively, it may operate to receive SIB1 PDSCH in a manner of applying L-point DFT block corresponding to a BW (=N RBs=L REs) size of an initial active DL BWP indicated on PBCH. Moreover, it may operate to receive SIB1 PDCCH by applying Lc-point DFT block corresponding to a BW (=Nc RBs=Lc REs) size of a specific DL control resource set (e.g., CORESET index #0) indicated on PBCH.

[Method #D] Multiplexing Method of (i) SIB1 PDCCH and/or SIB1 PDSCH and (ii) DL Channel Transmitted in the Same Symbol (e.g., DFT-s-OFDM Symbol)

When both WFs of (1) SIB1 PDCCH and/or SIB1 PDSCH and (ii) multiplexed (mux) DL channel, which are scheduled/assigned to the same symbol, are based on DFT-s-OFDM, a single or plurality of DFT blocks are configured only with the rest of (K-N) RBs resulting from excluding N RBs (here, N RBs may be a DFT size or the corresponding RB number which will be assumed for SIB1 PDCCH and/or SIB1 PDSCH reception in [Method #C]) among total K RBs (here, K RBs may be the RB number corresponding to a band configured on a corresponding CC/BWP) of the corresponding symbol (hereinafter, Mux DFT-s-OFDM symbol), whereby a DL channel may be transmitted/received. For example, in FIG. 13 and FIG. 14, the K1 value is the RE number corresponding to N RBs and the K2 value is the RE number corresponding to (K-N) RBs, and a DL channel may be transmitted/received based on the plural DFT block structure. Here, Mux DFT-s-OFDM symbol means DFT-s-OFDM symbol in which simultaneous transmission of PBCH and other DL channel(s) is scheduled/assigned. Meanwhile, a BS failing to transmit a plurality of DFT blocks may not transmit a DL channel except SIB1 PDCCH and/or SIB1 PDSCH in a Mux DFT-s-OFDM symbol (or a slot to which the Mux DFT-s-OFDM symbol belongs). Hence, a UE may not expect reception of a DL channel except SIB1 PDCCH and/or SIB1 PDSCH in the Mux DFT-s-OFDM symbol (or the slot to which the Mux DFT-s-OFDM symbol belongs). For example, in a Mux DFT-s-OFDM symbol (or a slot to which the Mux DFT-s-OFDM symbol belongs), a UE may omit/skip a process for receiving a DL channel (e.g., PDCCH, PDSCH) except SIB1 PDCCH and/or SIB1 PDSCH. Alternatively, a UE unable to support plural-DFT block based DL signal reception may not expect reception of DL channel except SIB1 PDCCH and/or SIB1 PDSCH in a Mux DFT-s-OFDM symbol, or may selectively receive only a DL signal corresponding to a DFT block of one of SIB1 PDCCH and/or SIB1 PDSCH and DL channel (based on UE implementation).

In some implementations, when WFs of (1) SIB1 PDCCH and/or SIB1 PDSCH and (ii) DL channel, which are scheduled/assigned to the same symbol/slot are possibly different from each other (e.g., DFT-s-OFDM based SIB1 PDCCH and/or SIB1 PDSCH and CP-OFDM based DL channel), in a SIB1 PDCCH and/or SIB1 PDSCH transmitted symbol and/or a slot (including the SIB1 PDCCH and/or SIB1 PDSCH transmitted symbol), a UE may not expect the corresponding DL channel reception. Hence, in the corresponding symbol and/or slot, the UE may omit/skip the reception process (e.g., demapping, decoding) of the DL channel (e.g., PDCCH, PDSCH). Alternatively, in a SIB1 PDCCH and/or SIB1 PDSCH transmitted symbol and/or a slot (including the SIB1 PDCCH and/or SIB1 PDSCH transmitted symbol), a UE may assume that a WF of DL channel follows SIB1 PDCCH and/or SIB1 PDSCH (irrespective of a WF indicated/configured for the DL channel). To support such a UE operation at least, a WF of a DL channel may be dynamically indicated over PDCCH. Alternatively, in receiving a DL channel, a presence or non-presence of mux of SIB1 PDCCH and/or SIB1 PDSCH and DL channel may be signaled in a symbol, in which the corresponding DL channel is transmitted, and/or a slot (including the corresponding DL channel transmitted symbol).

Figure 16:
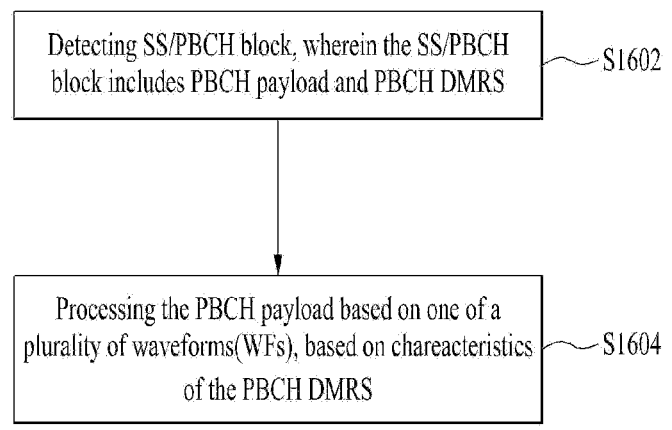

FIG. 16 illustrates a transmitting/receiving process according to one embodiment of the present disclosure. Referring to FIG. 16, a UE may detect an SS/PBCH block [S1602]. Here, the SS/PBCH block may include a PBCH payload and a PBCH DMRS. Thereafter, based on the characteristics of the PBCH DMRS, the UE may process the PBCH payload on the basis of a WF of one of a plurality of WF schemes [S1604]. Here, a plurality of the WFs may include a CP-OFDM scheme and a DFT-s-OFDM scheme. Preferably, the PBCH DMRS existing REs have N RE intervals in a frequency domain (where N is an integer greater than 1), and the characteristics of the PBCH DMRS may include a parameter used to generate a DMRS sequence, e.g., an initial value used to generate a DMRS sequence. In addition, based on processing the PBCH payload according to CP-OFDM scheme, a DFT size applied to the PBCH payload may be assumed as a value corresponding to a minimum band defined for a synchronization raster at which the SS/PBCH block is located.

Although not illustrated, another method of the WF indication may refer to [Methods #1 to 4], and the DFT size assumption in the initial access procedure may refer to [Methods #A to D].

Although not limited thereto, various descriptions, functions, procedures, proposals, methods, and/or operation flowcharts of the present disclosure in this document may apply to various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 17:
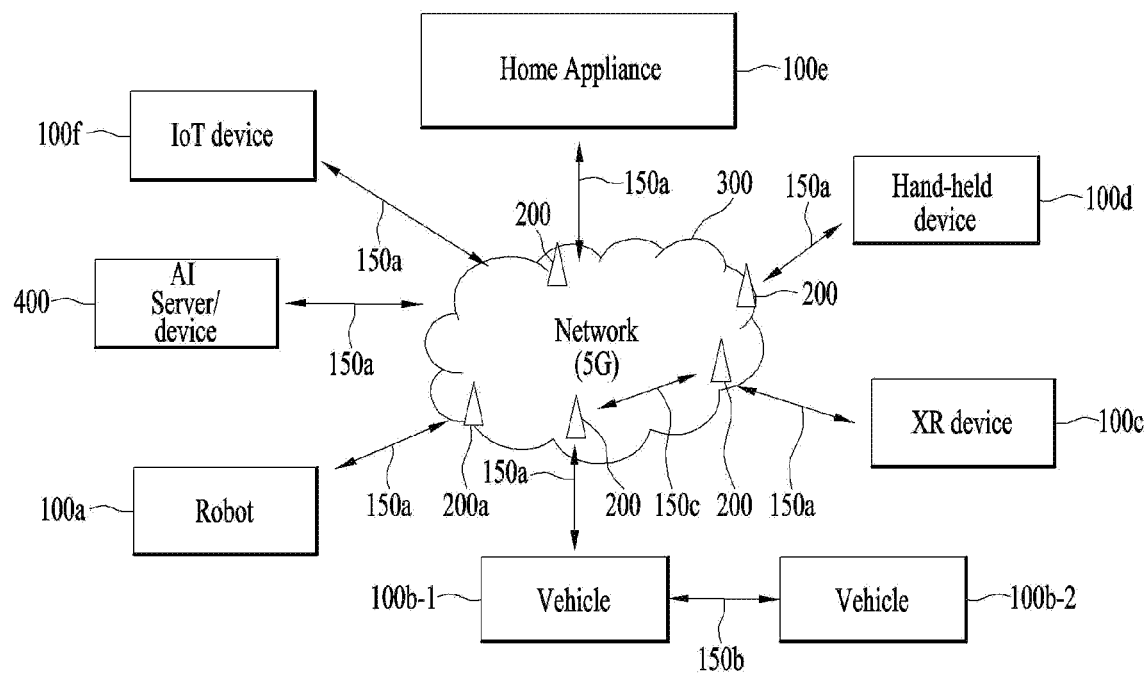
FIGS. 17 to 20 illustrate a communication system 1 and wireless devices applied to the present disclosure

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR)

device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
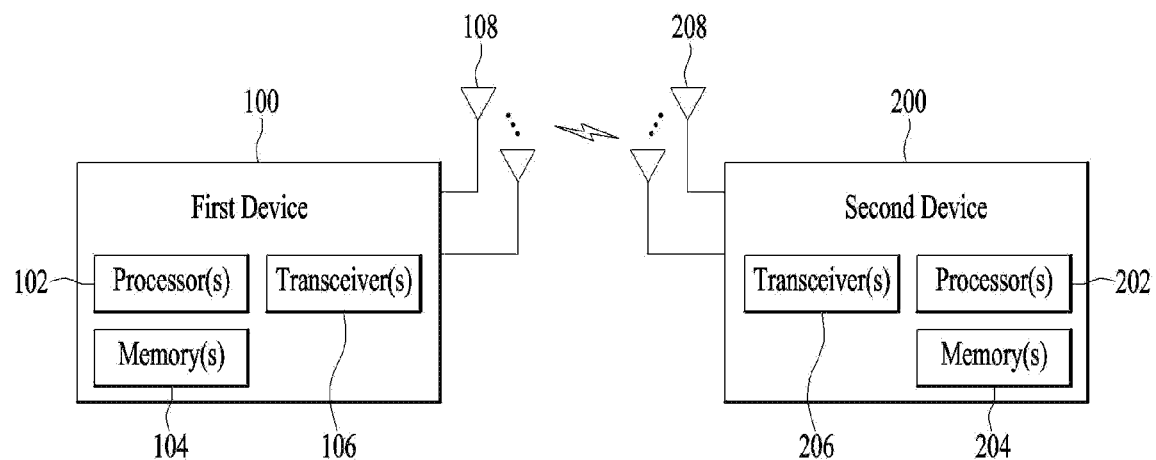

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present specification, at least one memory (e.g., 104 or 204) may store instructions or programs, and when executed, the instructions or programs may enable at least one processor operably connected to the at least one memory to perform operations according to some embodiments or implementations of the present specification.

In the present specification, a computer-readable storage medium may store at least one instruction or a computer program, and when the at least one instruction or computer program is executed by at least one processor, it may enable the at least one processor to perform operations according to some embodiments or implementations of the present specification.

In the present specification, a processing device or apparatus may include at least one processor and at least one computer memory connectable to the at least one processor. The at least one computer memory may store instructions or programs, and when executed, the instructions or programs may enable at least one processor operably connected to the at least one memory to perform operations according to some embodiments or implementations of this specification.

Figure 19:
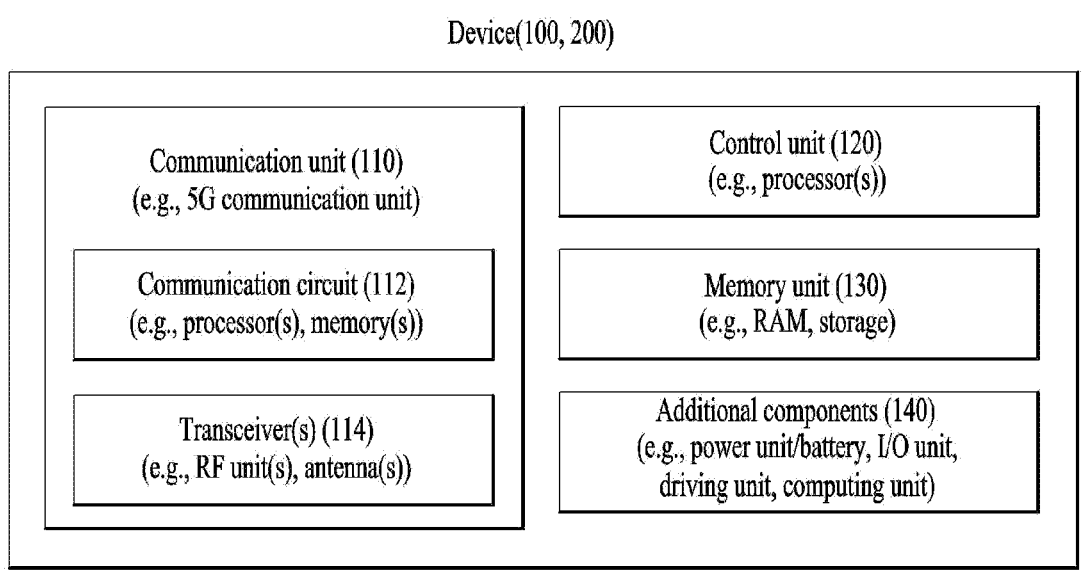

FIG. 19 illustrates another example of a wireless device applied to the present disclosure. The wireless device may be implemented in various forms according to a use-case/service (refer to FIG. 17).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, the wireless communication technology implemented in the wireless devices 100 and 200 of the present specification may include Narrowband Internet of Things for low power communication as well as LTE, NR, and 6G. In this case, for example, NB-IoT technology may be an example of Low Power Wide Area Network (LPWAN) technology, and may be implemented in standards such as LTE Cat NB1 and/or LTE Cat NB2, but is not limited to the above-described names Additionally or alternatively, the wireless communication technology implemented in the wireless devices 100 and 200 of the present specification may perform communication based on the LTE-M technology. In this case, as an example, the LTE-M technology may be an example of LPWAN technology, and may be referred to by various names such as enhance Machine Type Communication (eMTC) and the like. For example, LTE-M technology may be implemented by at least one of various standards such as 1) LTE CATO, 2) LTE Cat M1, 3) LTE Cat M2, 4) LTE non-Bandwidth Limited (non-BL), 5) LTE-MTC, 6) LTE Machine Type Communication, and/or 7) LTE M, but is not limited to the above-described names Additionally or alternatively, the wireless communication technology implemented in the wireless devices 100 and 200 of the present specification may include at least one of ZigBee, Bluetooth, and Low Power Wide Area Network (LPWAN) in consideration of low power communication, but is not limited to the above names. For example, ZigBee technology can generate Personal Area Networks (PANs) related to small/low-power digital communication based on various specifications such as IEEE 802.15.4, etc., and may be referred to as various names.

Figure 20:
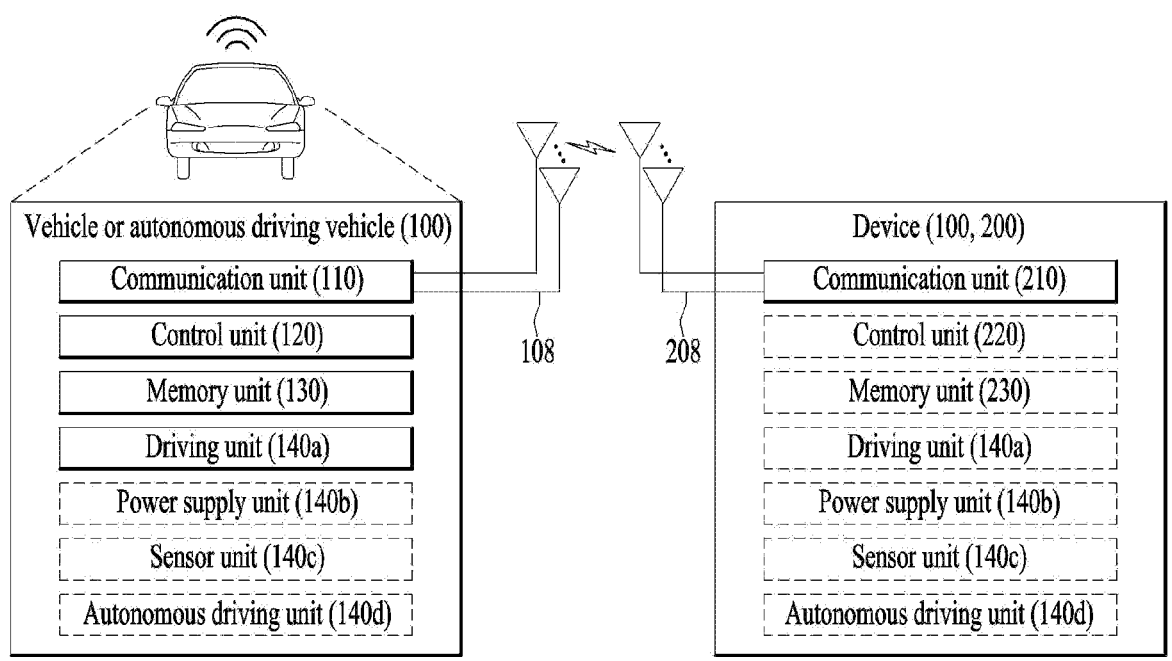

FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment (or proposal) may be included in another embodiment and may be replaced with corresponding constructions of another embodiment. It will be obvious that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

INDUSTRIAL APPLICABILITY

The present disclosure is applicable to a user equipment, a base station and other equipments of a wireless mobile communication system.

What is claimed is:

1. A method of performing communication by a user equipment in a wireless communication system, the method comprising:
    detecting an SS/PBCH (Synchronization Signal/Physical Broadcast Channel) block, the SS/PBCH block including a PBCH payload and a PBCH DMRS (Demodulation Reference signal); and
    processing the PBCH payload on the basis of a WF (Waveform) of one of a plurality of WF schemes,
    wherein a plurality of the WF schemes include a CP-OFDM (Cyclic Prefix Orthogonal Frequency Division Multiplexing) scheme and a DFT-s-OFDM (Discrete Fourier Transform-spread-OFDM) scheme at least,
    wherein the WF is determined based on characteristics of the PBCH DMRS,
    wherein based on processing the PBCH payload according to the CP-OFDM scheme, a DFT size applied to the PBCH payload is assumed as a value corresponding to a minimum band defined for a synchronization raster having the SS/PBCH block located thereat.

2. The method of claim 1, wherein REs having the PBCH DMRS existing therein have N RE (Resource Element) intervals in a frequency domain (where N is an integer greater than 1) and wherein the characteristics of the PBCH DMRS include a frequency shift value applied to the PBCH DMRS.

3. The method of claim 2, wherein the characteristics of the PBCH DMRS include a parameter used to generate a DMRS sequence.

4. The method of claim 3, wherein the characteristics of the PBCH DMRS include an initialization value used to generate the DMRS sequence.

5. A user equipment used in a wireless communication system, the user equipment comprising:
    at least one processor; and
    at least one computer memory operably connected to the at least one processor and enabling the at least one processor to perform an operation when executed, the operation comprising:
    detecting an SS/PBCH (Synchronization Signal/Physical Broadcast Channel) block, the SS/PBCH block including a PBCH payload and a PBCH DMRS (Demodulation Reference signal); and
    processing the PBCH payload on the basis of a WF (Waveform) of one of a plurality of WF schemes,
    wherein a plurality of the WF schemes include a CP-OFDM (Cyclic Prefix Orthogonal Frequency Division Multiplexing) scheme and a DFT-s-OFDM (Discrete Fourier Transform-spread-OFDM) scheme at least,
    wherein the WF is determined based on characteristics of the PBCH DMRS, and
    wherein based on processing the PBCH payload according to the CP-OFDM scheme, a DFT size applied to the PBCH payload is assumed as a value corresponding to a minimum band defined for a synchronization raster having the SS/PBCH block located thereat.

6. The user equipment of claim 5, wherein REs having the PBCH DMRS existing therein have N RE (Resource Element) intervals in a frequency domain (where N is an integer greater than 1) and wherein the characteristics of the PBCH DMRS include a frequency shift value applied to the PBCH DMRS.

7. The user equipment of claim 5, wherein the characteristics of the PBCH DMRS include a parameter used to generate a DMRS sequence.

8. The user equipment of claim 7, wherein the characteristics of the PBCH DMRS include an initialization value used to generate the DMRS sequence.

9. An apparatus for a user equipment, the apparatus comprising:
    at least one processor; and
    at least one computer memory operably connected to the at least one processor and enabling the at least one processor to perform an operation when executed, the operation comprising:
    detecting an SS/PBCH (Synchronization Signal/Physical Broadcast Channel) block, the SS/PBCH block including a PBCH payload and a PBCH DMRS (Demodulation Reference signal); and
    processing the PBCH payload on the basis of a WF (Waveform) of one of a plurality of WF schemes, wherein a plurality of the WF schemes include a CP-OFDM (Cyclic Prefix Orthogonal Frequency Division Multiplexing) scheme and a DFT-s-OFDM (Discrete Fourier Transform-spread-OFDM) scheme at least, wherein the WF is determined based on characteristics of the PBCH DMRS, wherein based on processing the PBCH payload according to the CP-OFDM scheme, a DFT size applied to the PBCH payload is assumed as a value corresponding to a minimum band defined for a synchronization raster having the SS/PBCH block located thereat.

10. The apparatus of claim 9, wherein REs having the PBCH DMRS existing therein have N RE (Resource Element) intervals in a frequency domain (where N is an integer greater than 1) and wherein the characteristics of the PBCH DMRS include a frequency shift value applied to the PBCH DMRS.

11. The apparatus of claim 9, wherein the characteristics of the PBCH DMRS include a parameter used to generate a DMRS sequence.

12. The apparatus of claim 11, wherein the characteristics of the PBCH DMRS include an initialization value used to generate the DMRS sequence.

\* \* \* \* \*